(No Model.) 6 Sheets—Sheet 1.
R. J. HUTCHINGS.
APPARATUS FOR PICKLING AND SWILLING METAL PLATES AND OTHER WARES.
No. 282,083. Patented July 31, 1883.
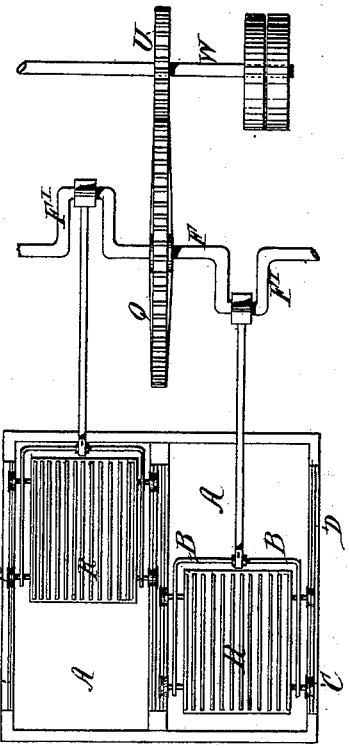
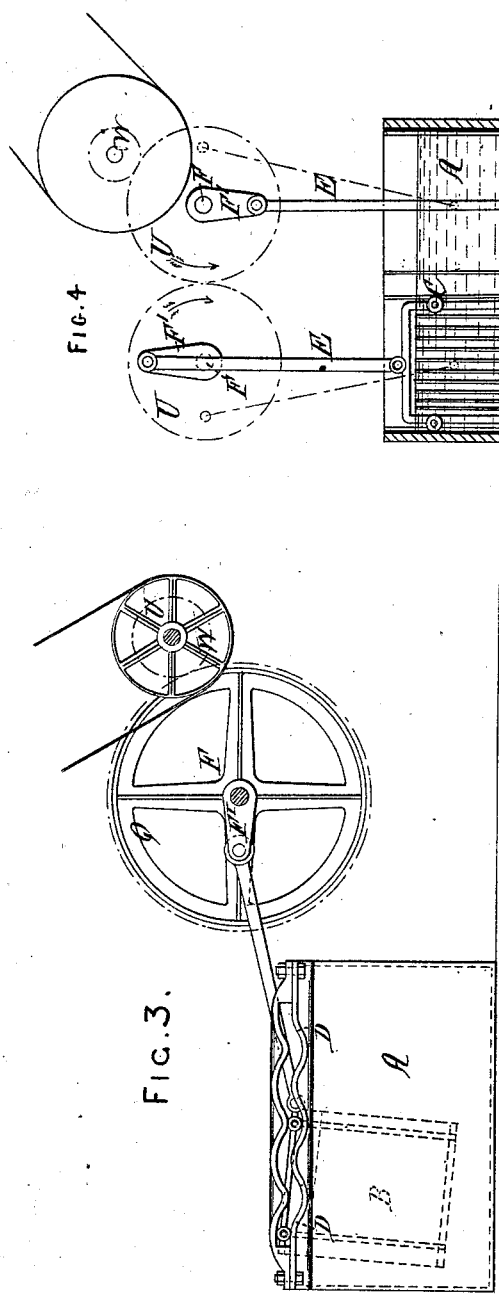
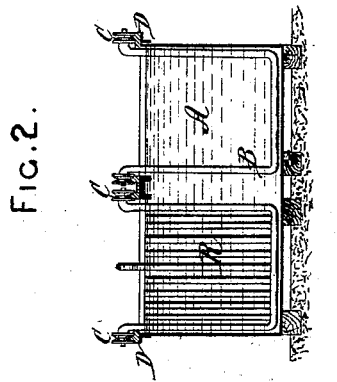
Witnesses
Chas. H. Smith
J. Hail
Inventor
R. J. Hutchings
per Lemuel W. Serrell
atty
N. PETERS, Photo-Lithographer, Washington, D. C.

(No Model.) 6 Sheets—Sheet 2.
R. J. HUTCHINGS.
APPARATUS FOR PICKLING AND SWILLING METAL PLATES AND OTHER WARES.
No. 282,083. Patented July 31, 1883.
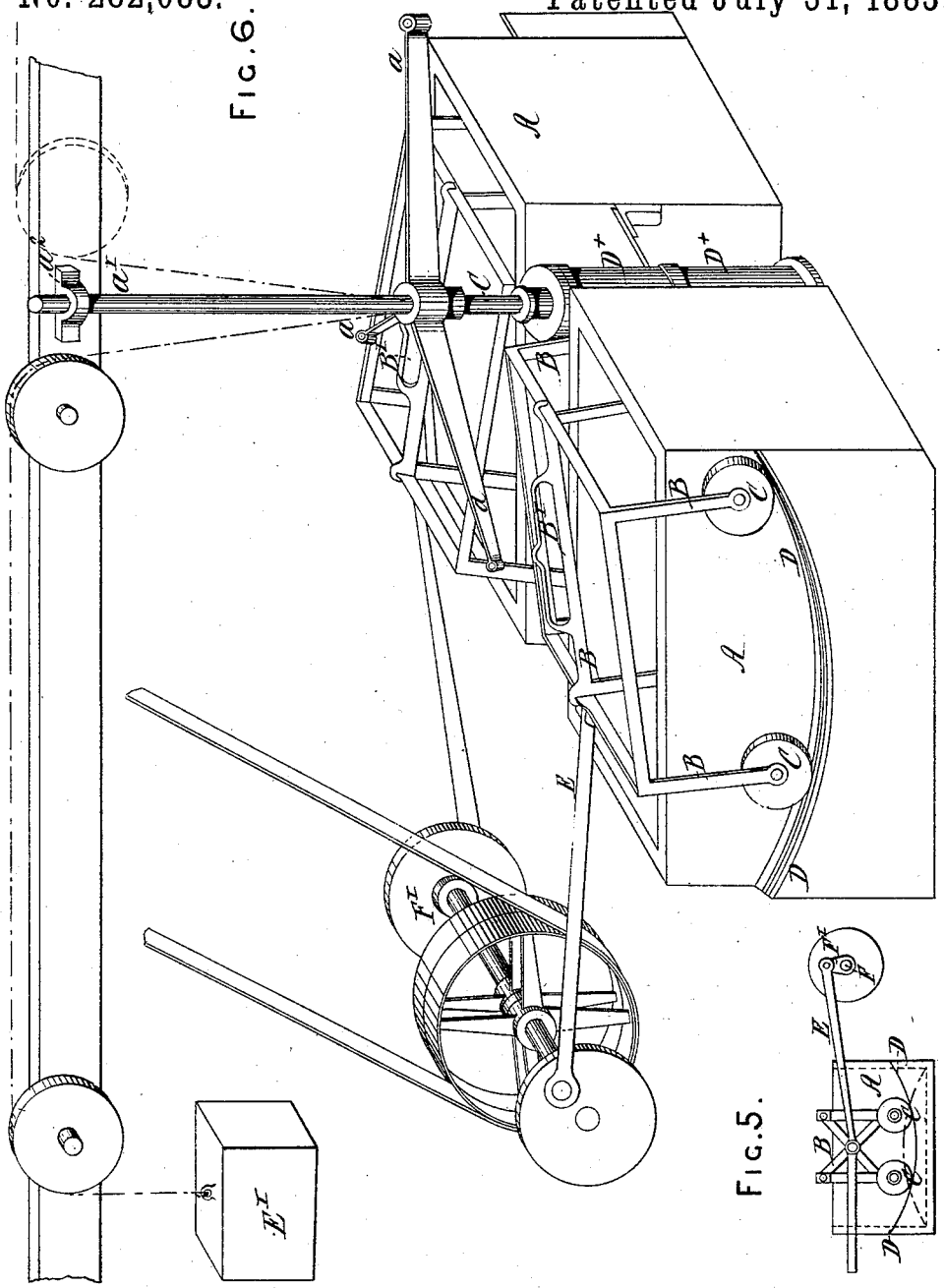
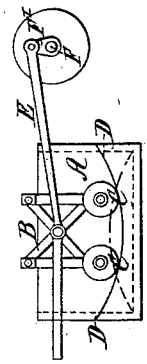
Witnesses
Chas H Smith
J. Hail
Inventor
R. J. Hutchings
per Lemuel W. Serrell
atty (No Model.) 6 Sheets—Sheet 3.
R. J. HUTCHINGS.
APPARATUS FOR PICKLING AND SWILLING METAL PLATES AND OTHER WARES.
No. 282,083. Patented July 31, 1883.
Fig. 7. Fig. 8.
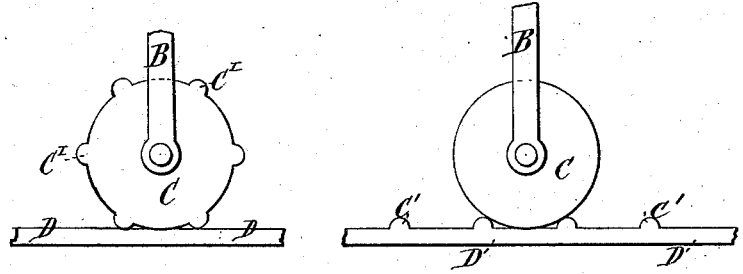
Fig. 9.
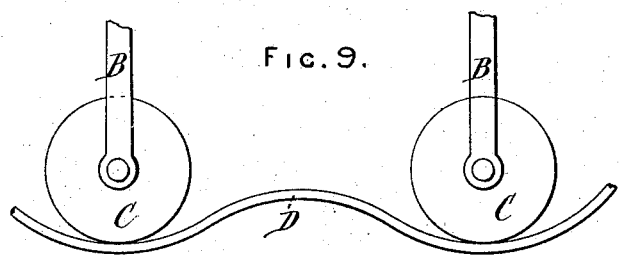
Fig. 10.
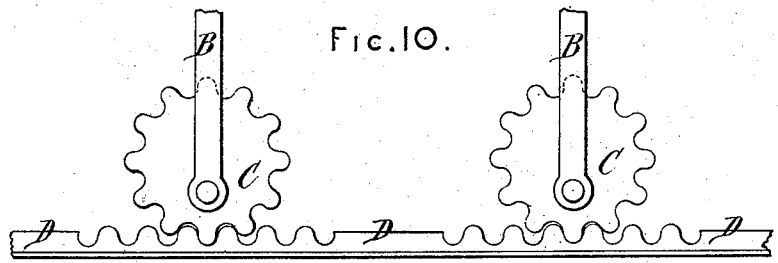
Fig. 12. Fig. 11.
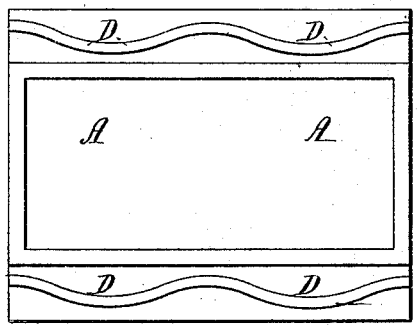
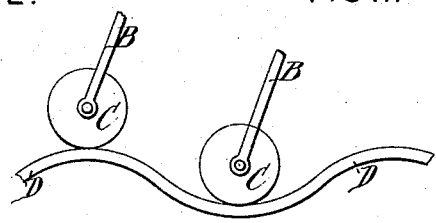
Witnesses
Chas. H. Smith
J. Hail
Inventor
R. J. Hutchings
for Lemuel W. Serrell
Atty
N. PETERS. Photo-Lithographer, Washington, D. C.

(No Model.) 6 Sheets—Sheet 4.

R. J. HUTCHINGS.

APPARATUS FOR PICKLING AND SWILLING METAL PLATES AND OTHER WARES.

No. 282,083. Patented July 31, 1883.

Witnesses
Chas N Smith
J. Hail

Inventor
R. J. Hutchings
per Lemuel W. Serrell
atty (No Model.) 6 Sheets—Sheet 5.
R. J. HUTCHINGS.
APPARATUS FOR PICKLING AND SWILLING METAL PLATES AND OTHER WARES.
No. 282,083. Patented July 31, 1883.
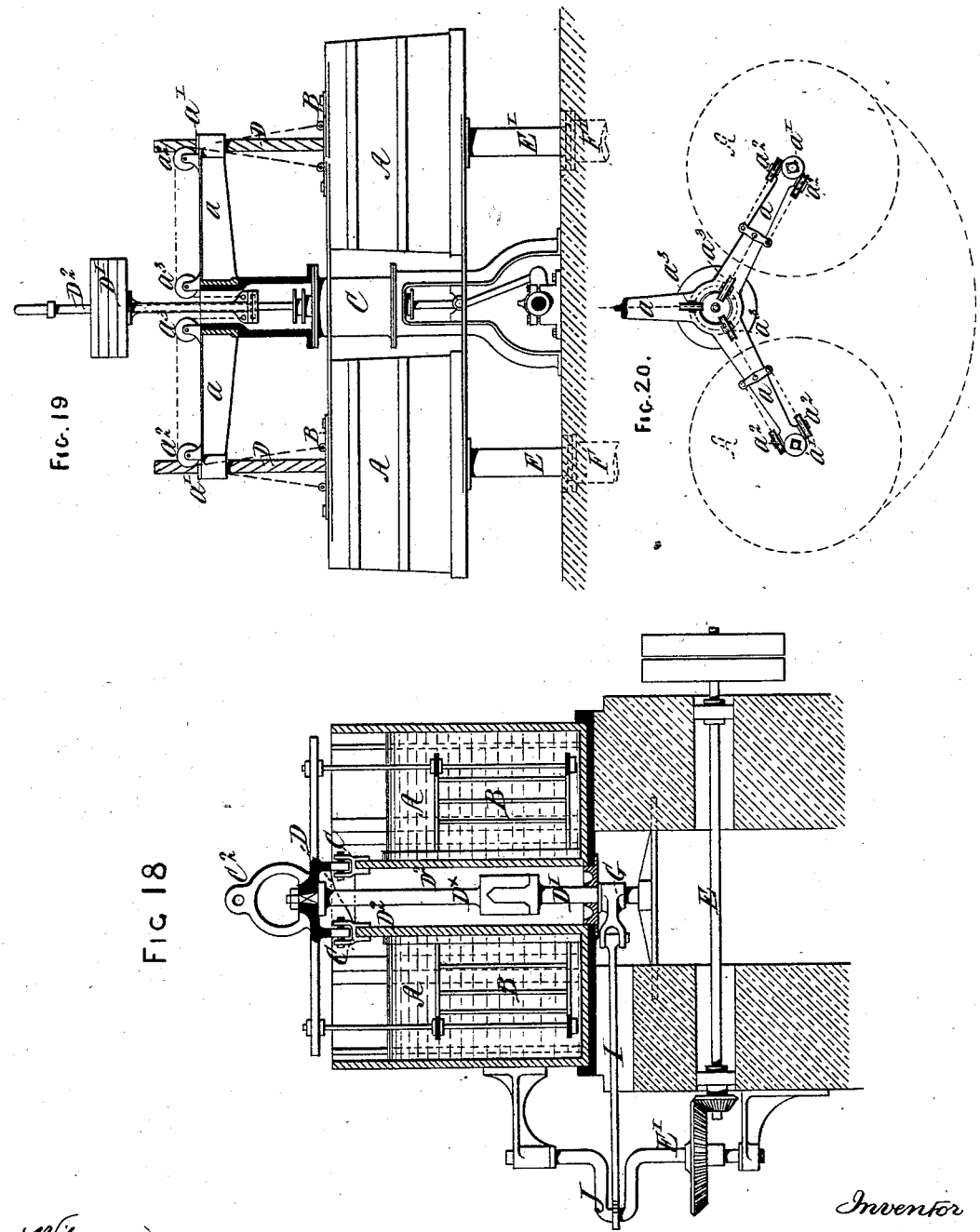

(No Model.) 6 Sheets—Sheet 6.

R. J. HUTCHINGS.

APPARATUS FOR PICKLING AND SWILLING METAL PLATES AND OTHER WARES.

No. 282,083. Patented July 31, 1883.

Witnesses
Chas H Smith
I Hail

Inventor
R. J. Hutchings
per Lemuel W. Serrell
atty

United States Patent Office.

RICHARD J. HUTCHINGS, OF SWANSEA, COUNTY OF GLAMORGAN, ENGLAND.

APPARATUS FOR PICKLING AND SWILLING METAL PLATES AND OTHER WARES.

SPECIFICATION forming part of Letters Patent No. 282,083, dated July 31, 1883.

Application filed November 28, 1881. (No model.) Patented in England March 18, 1876, No. 1,171, and November 22, 1880, No. 4,837.

*To all whom it may concern:*

Be it known that I, RICHARD JAMES HUTCHINGS, of Swansea, in the county of Glamorgan, England, have invented new and useful Improvements in Machinery or Apparatus for Pickling and Swilling Metal Plates and other Wares, (for which I have obtained a patent in Great Britain bearing date March 18, 1876, No. 1,171,) of which the following is a specification.

In a previous United States Patent, application filed March 11, 1881, I have described and claimed a peculiar method of working or mode of operation, in connection with pickling and swilling by machinery, two vats being employed, each vat being fitted with a movable platform-frame or cradle adapted to receive the plates or goods to be treated, and such cradles, with their plates or goods, being arranged to be removed bodily from and into the vats, preferably by means of a three-armed cross-head adapted to be raised and lowered and swung round its center, so that while the plates in the cradle in one vat are being pickled the already-pickled plates in the cradle in the other vat are being swilled, and the already-swilled plates simultaneously removed from a third cradle and fresh black plates put in instead, which third cradle is then put in the swilling-vat, and so on, no loss of time being thus incurred, and a minimum number of workmen being employed. In the said application I also describe and claim the application of revolving and oscillating platforms and cradles in connection with such peculiar mode of working. Now, in this present invention I make use of similar pickling and swilling-vats and cradles for holding the plates, but in connection with mechanism having a reciprocating lateral or rectilinear motion (instead of a revolving or oscillating motion around an upright shaft) and for such a purpose I construct the machinery similar to that described in my previous application, so that I bodily remove the cradle, with its racks and their contents, from and into the vats; but I may, and in many cases by preference do, construct the machinery so that I make the cradles or reciprocating frame as permanent fittings in the vats, and make the rack detachable or separate therefrom, so that I do not lift the reciprocating frames in and out of the vats; but I lift the rack, with its plates, to be treated bodily in and out of the vats. The motion of the cradles is either quite or mainly in a back-and-forth direction.

Another object of this invention is to improve upon the apparatus described in my aforesaid patent application, and to apply a mode of action to them of a character similar to that which I in some cases use with the reciprocating cradles.

I will also premise that I prefer, in my present invention, to use the three-armed cross-head, so mounted and fitted on or with a central shaft that it can be raised or lowered and swung round as required, (although I do not show this in all the figures of my drawings forming part of this my present application,) as I have found it convenient for carrying out the aforesaid mode of working claimed in my aforesaid previous application.

According to the first part of this invention, I use cradles having a rectilinear motion horizontally, vertically, or in any slanting or intermediate position, having a lateral motion; also, so that while mainly moving in a back-and-forth direction, a compound motion is imparted deviating from the straight line, whereby I increase the desired scouring action on the plates or other goods to be treated, and thus expedite the work. The reciprocating motion and the deviation from the straight line may be effected by cranks and by cam-paths, or by any other known mechanical device suitable for those purposes; and it would be perfectly impossible to describe all the more or less suitable means and modes of doing it, so that I consider myself only bound to show and describe some typical and perfectly suitable modes of carrying out my invention without in any way limiting myself to those thus described.

Figure 1 is a plan, and Fig. 2 a vertical cross-section, of two vats, A, arranged side by side and having each a frame or cradle, B, mounted on wheels C, which run on the tracks or rails D, laid or arranged along the two side edges of the vat A. The racks R, containing the plates or other goods to be treated, are placed in the cradles or carriages B, and these latter are reciprocated in the vats A in any convenient way—for instance, by means of cranks F' upon the shaft F, which, by means of pinion U, fixed on a revolving-shaft, W, and gearing with a spur-wheel, Q, on the shaft F, communicates revolving motion to the latter. In Fig. 2 the cradle B is in one of the vats—for the sake of clearness shown without a rack in. If I wish to increase the scouring action of the liquid, (pickling-fluid in one vat and raising or swilling water in the other,) I form the rail or rail-track D of a curved or wave shape, the latter being shown in the side view, Fig. 3, for the wheels C to work on or between, as will be easily understood.

Fig. 4 is a vertical section through a vertical arrangement of pickling-vat and swilling-vat, in which the cradles R are worked up and down, being guided sufficiently therein by the wheels C. The cradles receive motion by connecting-rods E from cranks F' on shaft F, which are shown connected by spur-wheels U, one of which is revolved by tooth-wheels from a shaft, W. From what has already been stated it will be understood that when the plates in the rack R in the carriage B in the pickling-vat have been sufficiently pickled (while simultaneously the plates in the rack in the other vat have been swilled, and while the swilled plates in a third rack, which is out of the vat, are being removed therefrom to be dried and other plates put in instead) the said rack, with its contents, is lifted out of the pickling-vat by preference by means of the three-armed movable swinging and rising and falling cross-head above referred to, and simultaneously the rack in the swilling-vat is lifted out with its contents, and simultaneously the third rack, with its fresh supply of plates, is raised to the same height by a swinging motion of the cross-head. I then bring the last-named rack over the pickling-vat, and the rack with the pickled plates over the swilling-vat, and the rack with the swilled plates away clear of the swilling-vat. I then drop all three racks into their places, the one into the carriage B of the pickling-vat, the other into the carriage B of the swilling-vat, and the third onto the ground. The racks are then detached from the three-armed cross-head and the simultaneous operation of pickling, swilling, and removing and replacing the swilled plates commenced again.

Fig. 5 is a side elevation of a vat and attachments. In this example the cradle in the said vat receives a curved motion. A is the vat; B, frame or cradle for supporting-rack adapted to receive plates or other metal goods. C C are wheels which run on the curved tracks or rails D. The required reciprocatory motion may in this case be communicated to the cradle and crate-carrier B by a connecting-rod, E, worked from the crank F' on the shaft F; but any other well-known mechanical appliance for producing such motion may be used, if desired. Instead of the cradle dipping more in the center it may dip at each end, which movement may be produced by having a convex rail, as shown by dotted lines in Fig. 5. Two cradles may be worked in opposite directions in one bath.

In order to show the apparatus more clearly, I have shown a perspective view at Fig. 6, where there are two vats, one for pickling and one for swilling. They are provided with the curved rails on each side for imparting to the cradles and carriers a combined reciprocatory and curved motion. It will be observed that there are arms $a\ a\ a$ mounted on the piston or plunger C. These arms, as will be hereinafter more particularly referred to, are for conveying the cradles and contents from one vat to the other, at the same time allowing of the reloading of one cradle at one end. The cradles B are coupled to the triangular arms $a\ a\ a$ by links or chains, (not shown,) and in order to allow of the play of the cradle the said cradles are provided with a long slot, B', to allow of the said movement of the cradle and the free play of the chain or link from the arms $a$. When the pickling and simultaneous swilling operations are completed the machinery is stopped, steam or other pressure is admitted to the cylinder $D^\times$, and both cradles, with their racks and plates, are withdrawn from and transferred, one from the pickling to the swilling vat and the other from the swilling-vat to the outside of apparatus, for emptying and reloading or otherwise, and then being put in the pickling-vat, by the next operation the third cradle, meanwhile having been emptied of its swilled goods and filled with black goods, is dipped into the pickling-vat. E is a counterpoise to assist the piston in the lift of the cradles. $a'$ is a continuation of the piston-rod working through the guide $a^2$. Obviously the cradles B should be made so as to be instantaneously detachable from the connecting-rod E, or else the racks be made so as to be lifted out of the cradles B, which latter then always remain in their respective vats. Instead of using a curved or concave or convex rail, I may provide the rollers or wheels C with projections C', as shown in Fig. 7, so that a jerk-motion is imparted to the cradle and its attachments on its backward and forward travel.

Fig. 8 is a view of wheel C, running on a rail, D, that is provided with slight projections (or it may be indentations) to impart a jerk-motion to the cradle.

Fig. 9 is a diagram of another form of rail D, where the rail is so curved that in all positions the cradle will be horizontal, or nearly so, but yet receive a slight rising-and-falling motion while reciprocating in the vat.

Fig. 10 is another modification for imparting a rising-and-falling motion to the cradle during its reciprocatory travel. In this example the wheels are mounted eccentrically on their axes and provided with teeth engaging with corresponding teeth on the rails D.

Fig. 11 shows a rail in which the cradle receives a backward-and-forward and slanting rising-and-falling motion alternately.

Fig. 12 shows a vat in plan, with a pair of rails, D, bent in the horizontal direction for imparting a lateral motion to the cradle. It is obvious that there are many ways in which an irregular motion may be given to the cradles, or vice versa, in a similar manner, to the vats; but I have shown only some of the ways of affecting this motion; and it may also be by guides or by sheaves or other equivalents. The wheels C need only be segments of circles, and provided with teeth on their peripheries gearing with corresponding teeth on the rails D on each (or the said teeth may be on only one) side of the vat A. Where there are several or a series of vats of the above described construction, the motion may be imparted to all of them simultaneously by coupling the cradles together by additional links or connecting-rods—that is, providing that all the vats are in a line, when they might all be driven by one connecting-rod, E.

Figure 13:
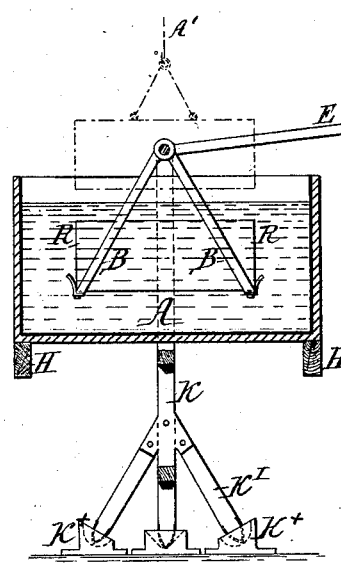
Figure 14:
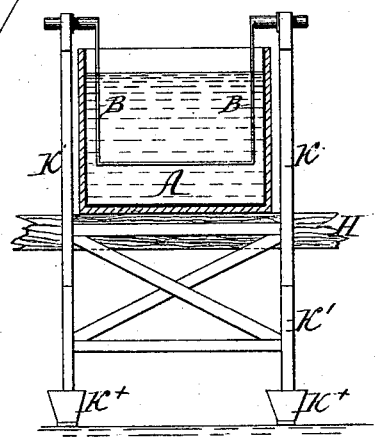

Fig. 13 is a sectional elevation, and Fig. 14 is an end view, of another form of apparatus constructed according to this invention. The racks R are held in suitable cradles or carriers B, and driven—for instance, as here shown—by crank F' and connecting-rod E, as before; but instead of the said cradles or carriers being supported by wheels, as before described, they are in this case held or supported on each side by levers, at the lower part of which are crutches diverging from the main lever. A' is the chain for suspending the racks R, which chain may be in connection with any suitable hoisting appliance; or it may be attached to a triangular or other support, above which latter it may be elevated in any convenient way, or in a manner that will be hereinafter referred to. The cradle B in the pickling-vat is made preferably of brass, as are also the racks, (or of a metal or material that will withstand the action of the acid;) but the cradle in the swilling-vat may be of iron or any other material. The vat A is of wood or lead, or both combined. H H are beams for supporting the vats. K K are the lever-standards, with crutches K', on which the cradles B are connected or fixed. There are preferably two crutches for each vat, one on each side, as shown, Fig. 14, and are preferably made with crutches K'. The cradles are by this means easier to work, as at or about the end of each stroke one or other of the crutches bears on its corresponding shoe, K$^\times$, thus raising the other end, giving a start to the cradle and attachments, and so giving the plates a shake each time the toes of the extensions K' touch the shoes K$^\times$ in the downward stroke, and also facilitate the bringing of the cradles B to their proper position to receive racks, or for their removal. I may dispense with the intermediate leg, K$^2$, which imparts a double curve from the shoes K$^\times$ and gives a jerk to the plates midway at the center of the vat, and at the same time gives the plates a slight dip. The cradles may be stationary, and the standards or crutches may be attached to the vat or vats, if necessary. E is the connecting-rod, and F is the crank-shaft. There may be also two or more, comprising a series, actuated by the one crank, as before stated.

Figure 16:
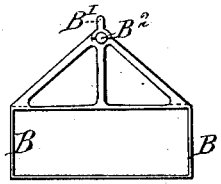
Figure 15:
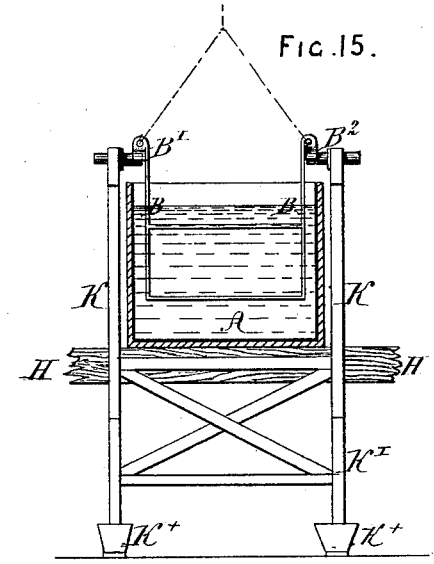

Instead of supporting the racks R by the cradles B, as shown at Figs. 13 and 14, the cradle may form the rack and be made removable, and for this purpose be provided with cups or projections B' to fit over the pin or carrier B$^2$, as shown at Fig. 15 in sectional end elevation, and detached side view at Fig. 16. By this means the rack forms the cradle and is easy of withdrawal. The cradle does not oscillate, like a pendulum, in the vat, as I have found that such a swinging motion causes a greater agitation of the liquor at the bottom of the vat than at the top, thus making blisters on the plates under treatment.

Figure 17:
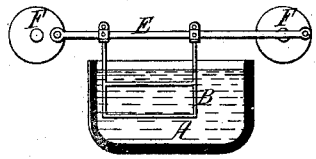

Fig. 17 shows an arrangement in which the cradle receives a gradually dipping and rising motion by means of two revolving or rocking crank-disks, F, and a connecting-rod, E, having the same motion as the side rods on a locomotive-engine. The same up and down or plunging motion, hereinbefore described with reference to reciprocating cradles, may also be applied to the revolving or oscillating cradles described in my aforesaid patent specification.

Fig. 18 is a vertical section of such an arrangement of vat. B is the cradle or frame for carrying the plates to be treated. A is the vat. D$^2$ is a well arranged in the center of the vat and open at top and bottom. This well surrounds the shaft D$^\times$, which gears with a clutch on a lower shaft, D'. E is the driving shaft or spindle, and gearing with a vertical shaft, E'. The oscillatory screw motion is imparted to the cradle B through the medium of this shaft E' by a crank, J, thereon. G is the arm keyed onto the shaft D', and I the connecting-rod coupling the crank J and the arm G. The lifting out of the cradles is effected in a similar manner to that described in my former patent. The well in the center of the vat in this case carries the rollers C, and the undulating rail or cam track or tracks D are on the under side of the head or arms which carry the cradles. C$^2$ is a ring by which the cradle and its contents may be raised or lowered out of or into the bath. Instead of arranging the crate-driving gear below the vat, and in a central well or shaft through the bath, I may arrange the driving-gear and the rails or cam-tracks in any convenient place outside the vat, which latter may then rest on the ground, thus doing away with pillars and other foundation parts, and doing away with the central shaft through the bath. By the addition of ribs or projections on the inner walls of the vat, as described in my aforesaid previous application, which ribs act as obstructions, the liquor is still further agitated and conflicting currents are caused to impinge upon the sides of the plates. When the plates have been sufficiently immersed and heated in the vat A, the cradle B and its clutch-shaft D× are raised and transferred, with their contents, to another similar vat containing water, where the plates are washed and swilled in a similar manner.

Another arrangement of apparatus with a similar screw motion to that shown at Fig. 18 is shown at Fig. 19, which is a front elevation, and at Fig. 20, which is a part plan. B B are the cradles; A, the pickling-vat and the swilling-vat. C is a steam-cylinder, and $D^2$ is a continuation of the piston-rod, carrying a counterbalance-weight, D'. $a\ a\ a$ are the triangularly-disposed arms, and at the extremity of each is a nut, $a'$, through which the screw D passes. From the cradles B chains are connected to the continuation of the piston-rod $D^2$, and pass over grooved guide-pulleys $a^2\ a^3$, so that as the cradle is raised by the descent of the piston a screw-like motion is imparted to the cradle by reason of raising the screw D through the fixed nut $a'$. The screws D are square bars twisted into screw form. They are each fastened to a crate or series of crates. Instead of raising the cradles out of the vats, as before described, I have in this example shown the vat A removable—that is, when it is desired to transfer the cradles from one vat to another, I lower the vats. For this purpose the vats are provided with plungers E E', working in preferably hydraulic cylinders F F', (shown in dotted lines.) The baths are kept elevated by pumps driven by the engine, and on the opening of a cock the pressure escapes, and the vats are consequently lowered.

Having now described my invention with reference to vertical and horizontal directions of motion of cradles, I will describe an apparatus with a slanting motion of cradles.

Figure 21:
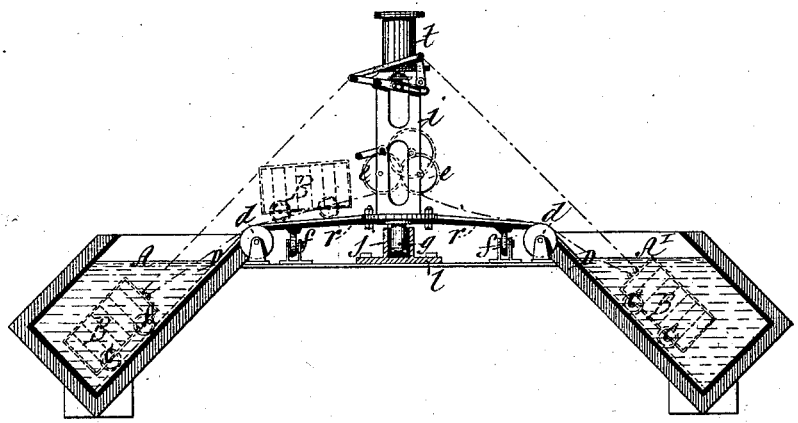
Figure 22:
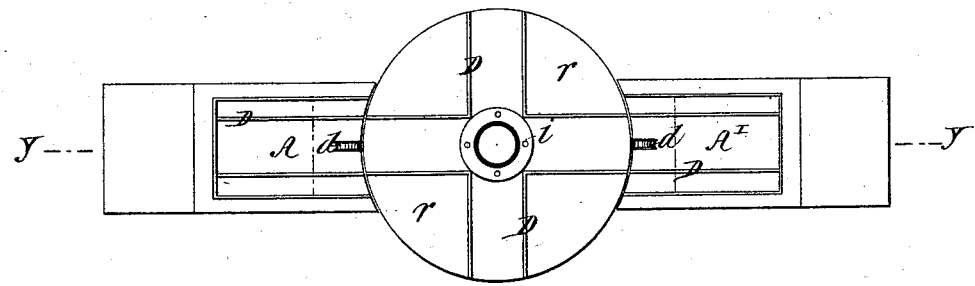

Fig. 21 is a sectional elevation through line Y Y of Fig. 22, which is a part plan of Fig. 21. B B are the cradles, A A' the vats, which are slanting, and at the top there is a turn-table, $r$, for conveying a cradle, rack, or other carriage to either the pickling-vat A or swilling-vat A', or to the delivery side, as may be required. The cradles B are each provided with two chains or equivalent, the upper ones being actuated by levers from a steam-cylinder, $t$, which is secured to a column, $i$, bolted centrally to the turn-table $r$. The lower chains, which are for raising the cradles B out of the vats, pass around drums $e\ e$, geared together and actuated by windlass or otherwise. The upper chains are for actuating the cradles in the vats, and when one cradle descends—for example, in the vat A—the cradle in the other or opposite vat, A', ascends to the distance shown, so counterbalancing each other. $d\ d$ are guide-pulleys for carrying and guiding the lower chains when lowering or raising the cradles into or out of the baths. The cradles or carriages B are provided with wheels C, which run on rails D and serve to guide the cradles in their reciprocatory travel. The turn-table $r$ is slanting, so that acid from the vat A or water from the vat A' may return to them by the rails or grooves. $l$ is a lead-plate carrying the step or bearing $j$, to receive the pivot $g$ for supporting the central portion, and guiding the travel of the turn-table $r$. $f\ f$ are friction-wheels for supporting the turn-table toward its outer edge.

Figure 23:
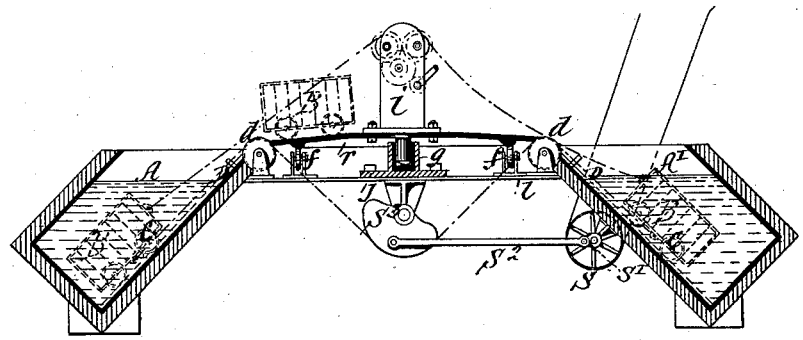

Fig. 23 is a sectional elevation of another modification of means for actuating the cradles in the baths, which are arranged precisely similar to those before described. The power is communicated, by belt or otherwise, to fast and loose pulleys S on the shaft, on which is a crank, S', imparting motion by a connecting-rod, $S^2$, to a grooved segment, $S^3$. The lower chains for actuating the cradles pass around the pulleys $d$, and thence to the segment $S^3$, on which they are connected, and the rocking motion is imparted to this segment, which raises one cradle while the other or opposite one is descending to counterbalance the lift of the one cradle, and rendering the operation more perfect. The cradles B B are raised out of or lowered into the vats A A' by the windlass arrangement on the capstan or standard $i$. The cradles are made to uncouple from the driving-chain. The driving-cylinder may be under the turn-table or railway, or on the central portion thereof, near the winch or other guiding appliance, independent of the turn-table. The carriages or vehicles for conveying the cradles, crates, racks, or other receptacles, either laden or empty, are, in the manner before described, thus driven or moved mechanically, manually, or in any other suitable or convenient manner, along the diagonal or other line or lines, either straight or curved, the motion being carried along a straight or curved line, or a series of curved lines or angles. Such diagonal line or lines may be at any angle or angles between the perpendicular and the horizontal. The plates or other metal goods may be placed on edge, ends, sides, or flat; or the same may be inclined in any approved direction, or at any angle, as may be found best suited to the size or shape of the plates, or to the numbers it might be required to pickle them in.

I do not, in this application, lay claim to the pickling and swilling apparatus in which a revolving or reciprocating motion about a vertical axis is made use of.

I am aware that in some instances a device has been employed for washing dishes wherein the wire basket for holding the dishes is stationary, and the water tank or receptacle and liquid contained therein are moved backward and forward for washing said dishes. This movement agitates the liquid and often dashes it over. In my device the liquid and its vat are stationary, and the cradle and metal plates are moved back and forth edgewise in the liquid, and a thorough cleansing is attained without great agitation of the liquid.

I claim—

1. The combination, with the vats for pickling and swilling metal plates, of the cages or cradles holding such plates, and mechanism, substantially as described, for imparting to the cradles and plates the compound movements specified, in which the plates have a rising and falling and a horizontal reciprocating, as well as a lateral, motion, substantially as specified.

2. In an an apparatus for pickling and swilling metal plates, the combination, with the vats for the pickling and swilling liquid, and cradles for holding the plates, of mechanism, substantially as specified, for imparting to the cradles and plates a reciprocating motion edgewise of the plates to effect a thorough pickling or swilling, substantially as set forth.

R. J. HUTCHINGS.

Witnesses:
E. S. BREWER,
E. W. ECAILLE,
    *Both of 33 Chancery Lane.*